(12) United States Patent
Meyers et al.

(10) Patent No.: US 6,513,379 B2
(45) Date of Patent: Feb. 4, 2003

(54) INFANT DRINKING CUP

(75) Inventors: Brenda J. Meyers, Reedsburg, WI (US); Bill Hudson, Fremont, MI (US)

(73) Assignee: Gerber Products Company, Reedsburg, WI (US)

( * ) Notice: Subject to any disclaimer, the term of this patent is extended or adjusted under 35 U.S.C. 154(b) by 0 days.

(21) Appl. No.: 09/727,012

(22) Filed: Nov. 30, 2000

(65) Prior Publication Data

US 2002/0062691 A1 May 30, 2002

(51) Int. Cl.$^7$ .............................. G01F 19/00
(52) U.S. Cl. ........................ 73/426; 215/11.2
(58) Field of Search .................. 73/426; 374/157; 215/11.2

(56) References Cited

U.S. PATENT DOCUMENTS

| | | | |
|---|---|---|---|
| 2,928,791 A | 3/1960 | Loconti | 252/408 |
| 2,978,584 A | 4/1961 | Loconti et al. | 250/83 |
| 3,125,984 A | 3/1964 | Okuyama | 116/114 |
| 3,275,400 A | 9/1966 | Bonitz et al. | 8/4 |
| 3,352,794 A | 11/1967 | Abdo | 252/408 |
| 3,576,604 A | 4/1971 | Hammond | 23/230 |
| 3,594,126 A | 7/1971 | Fergason et al. | 23/230 LC |
| 3,620,889 A | 11/1971 | Baltzer | 161/5 |
| 3,696,675 A | 10/1972 | Gilmour | 73/295 |
| 3,704,625 A | 12/1972 | Seto et al. | 73/356 |
| 3,782,195 A | 1/1974 | Meek et al. | 73/343 B |
| 3,816,335 A | 6/1974 | Evans | 252/408 |
| 4,105,583 A | 8/1978 | Glover et al. | 252/408 |
| 4,156,365 A | 5/1979 | Heinmets et al. | 73/343 B |
| 4,339,951 A | 7/1982 | Yee et al. | 374/162 |
| 4,408,905 A | 10/1983 | Ehrenkranz | 374/157 |
| 4,410,493 A | 10/1983 | Joslyn | 422/58 |
| 4,428,321 A | 1/1984 | Arens | 116/217 |
| 4,538,926 A | 9/1985 | Chretien | 374/150 |
| 4,588,409 A | 5/1986 | Sercus | 8/403 |
| 4,696,580 A | 9/1987 | Kameda | 374/162 |
| 4,878,588 A | 11/1989 | Ephraim | 215/11.2 |
| 4,919,983 A * | 4/1990 | Fremin | 428/35.7 |
| 4,933,525 A | 6/1990 | St. Phillips | 219/10.55 |
| 5,052,369 A | 10/1991 | Johnson | 126/400 |
| 5,085,607 A | 2/1992 | Shibahashi et al. | 446/14 |
| 5,151,324 A | 9/1992 | Hanatani et al. | 428/323 |
| 5,213,733 A | 5/1993 | Hwu et al. | 264/78 |
| 5,298,035 A | 3/1994 | Okamoto | 8/554 |
| 5,431,697 A | 7/1995 | Kamata et al. | 8/483 |
| 5,482,373 A | 1/1996 | Hutchinson | 374/141 |
| 5,588,747 A | 12/1996 | Blevins | 374/157 |
| 5,645,196 A | 7/1997 | Hancuff | 222/183 |
| 5,678,925 A | 10/1997 | Garmaise et al. | 374/157 |
| 5,685,641 A | 11/1997 | Ribi | 374/162 |
| 5,720,555 A | 2/1998 | Elele | 374/150 |
| 5,786,578 A | 7/1998 | Christy et al. | 219/720 |
| 5,860,540 A | 1/1999 | Bock | 215/11.2 |
| 5,918,981 A | 7/1999 | Ribi | 374/162 |
| 6,264,049 B1 * | 7/2001 | Shteynberg | 215/11.2 |

FOREIGN PATENT DOCUMENTS

| | | |
|---|---|---|
| EP | 0 284 735 | 2/1988 |
| GB | 2 268 691 A | 1/1994 |
| GB | 2 338 469 A | 12/1999 |
| GB | 2 348 610 A | 10/2000 |
| JP | 11076370 A | 3/1999 |
| WO | WO 98/49995 | 11/1998 |

OTHER PUBLICATIONS

"Munchkin News" website article, dated Oct. 29, 1996.
"Packaging News & Trends" article, date unknown.

* cited by examiner

Primary Examiner—Benjamin R. Fuller
Assistant Examiner—Andre Allen
(74) Attorney, Agent, or Firm—Drinker Biddle & Reath LLP

(57) ABSTRACT

An infant drinking cup is described. The infant drinking cup is a first color when at room temperature. When the cup is filled with a cold beverage, the portion of the cup below the fill line changes to a second color. When handled by an infant, those areas below the fill line in contact with the infant's warm hands change color back to the first color. The process is fully reversible, such that the infant drinking cup can change from the cold color to the warm color, and vice versa, repeatedly.

14 Claims, 2 Drawing Sheets

INFANT DRINKING CUP

FIELD OF THE INVENTION

The present invention involves the field of beverage containers. Specifically, the invention is directed to a beverage container for a child, the beverage container changing color responsive to temperature.

BACKGROUND OF THE INVENTION

Specially designed drinking cups for infants and small children are known. It is desirable to provide such cups to meet the special demands created by infants. First, infants have been known to accidently drop cups or even, on occasion, intentionally throw cups. It is therefore desirable to provide cups made of plastic or other material which will not easily break.

Infants have also been known to otherwise spill beverages contained within the cup. Spills may be the result of a child's underdeveloped coordination or intentional activities. Thus, it is desirable to provide cups with means to minimize the impact of spill incidents. Such means have included lids, spouts and straws.

Yet another challenge in infant drinking cup design, is the tendency of some children to become bored with their food and beverages. Such boredom may result in increased spilling or dropping incidents. Users of infant drinking cups will clearly recognize that anew and improved cup, which can effectively hold the attention of a child, will minimize the number of spilling, dropping and throwing incidents.

SUMMARY OF THE INVENTION

The invention is directed to an infant drinking cup which changes color responsive to temperature. The invention thus provides a cup capable of holding the interest and attention of a child while containing beverages to be consumed thereby.

The infant drinking cup of the present invention is a first color while the cup is at or above a first temperature, which will be referred to herein as the critical "hot" or "warm" temperature. When the cup is below a second temperature, which will be called the critical "cold" temperature, the side walls express a second color. The first color will be henceforth referred to as the warm color and the second color will be referred to as the cold color. Hybrid colors may be expressed when the infant drinking cup is exposed to conditions between the critical temperatures.

In the preferred embodiment, the critical hot temperature is below room temperature such that the cup expresses the warm color while exposed thereto. The critical cold temperature of the preferred embodiment is above the temperature of a household refrigerator, such that the cup changes color when a beverage, recently removed from a refrigerator, is poured into the cup. The color change process is fully reversible.

The cup of the current invention is formed from a plastic. A resin is blended with a temperature responsive coloring composition to provide the cold color. The blend is molded into a cup, preferably in a distinctive and attractive shape.

BRIEF DESCRIPTION OF THE DRAWINGS

For the purpose of illustrating the invention, there is shown in the drawings a form which is presently preferred; it being understood, that this invention is not limited to the precise arrangements and instrumentalities shown.

DETAILED DESCRIPTION OF THE DRAWINGS

Figure 1:
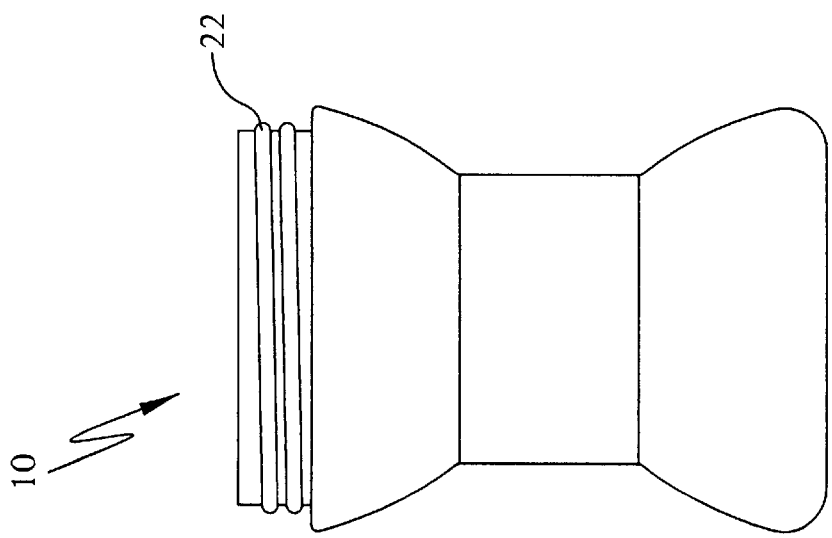
FIG. 1 is a front elevational view of an infant drinking cup according to the present invention at a warm temperature.

With reference to the drawings wherein like numerals identify like elements, there is shown in the figures an infant drinking cup generally identified by the numeral 10. As shown in FIG. 1, the infant drinking cup 10 is a single color. The color of the cup 10 as represented in FIG. 1 is referred to as the warm color, which is expressed while the side walls of the cup 10 are at or above a preselected critical "hot" temperature, $T_h$, which will be defined with greater detail below.

Figure 2:
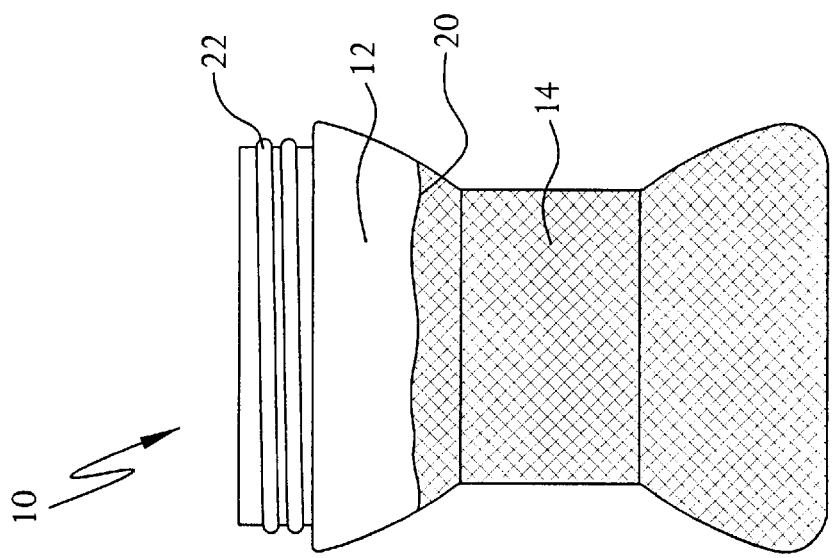
FIG. 2 is a front elevational view of an infant drinking cup as shown in FIG. 1 with a cold beverage filling most of the cup.

FIG. 2 shows the infant drinking cup with a substantial portion of its volume filled with a cold beverage. A fill line 20 marks the top of the fluid level. The beverage is below a critical "cold" temperature $T_c$. It is preferred that the cold temperature $T_c$ be near or above the average temperature of a typical household refrigerator, a refrigerator usually being about 4 degrees C. or 40 degrees F. In the most preferred embodiment, the cold temperature $T_c$ is about 14 degrees C. (about 57 degrees F.). Thus, a typical beverage which has been recently removed from a household refrigerator will have a temperature well below $T_c$.

Still referring to FIG. 2, the side wall area of the infant drinking cup 10 which is in contact with the cold beverage, (i.e. below the fill line 20), is designated by the numeral 14. The area 14 is cooled by virtue of its contact with the cold beverage, such that area 14 expresses the cold color. In contrast, the area of the cup above the fill line 20, which remains at room temperature, shown as area 12, remains above the hot temperature $T_h$ and, therefore, expresses the warm color. In the preferred embodiment of the infant drinking cup, the hot temperature $T_h$ is near or below average room temperature, room temperature being understood to be around 25 degree C. or 77 degrees F. Th is about 23 degrees C. (about 73 degrees F.) in the most preferred embodiment.

Figure 3:
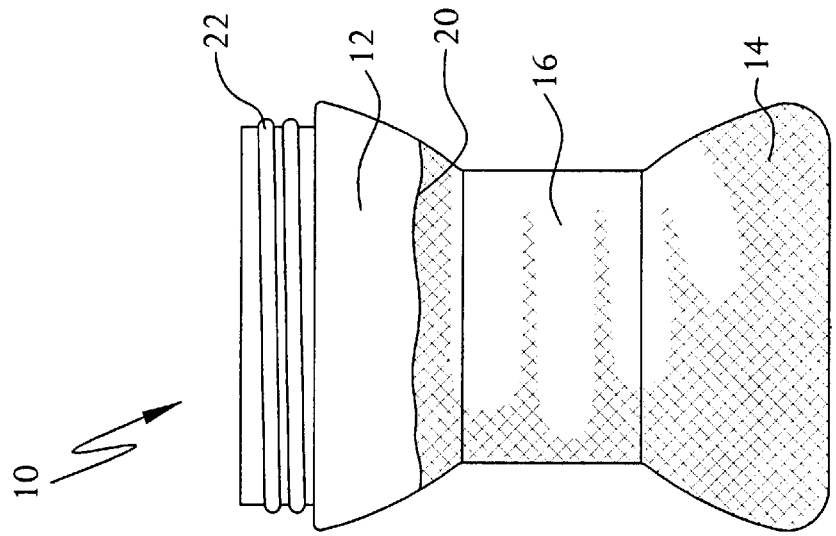
FIG. 3 is a front elevational view of an infant drinking cup as shown in FIG. 2 after a user has handled the cup.

FIG. 3 shows the drinking cup of FIG. 2 after it has been handled by a user with warm hands. The points of contact 16 between the side walls of the cup 10 and the user's hand and fingers have been warmed to a temperature above $T_h$, while the remainder of area 14 remains below $T_c$ due to the temperature of the beverage. Thus, the points of contact 16 are the warm color, like area 12, and are in the shape of the user's fingers and hand.

For purposes of clarity, the temperature examples provided herein represent the most typical environments which the invention is contemplated to encounter. At temperatures between $T_h$ and $T_c$, the cup 10 expresses intermediate shades or colors which are hybrids of the cold and warm colors. Temperatures between $T_h$ and $T_c$ may be encountered if the liquid within the cup 10 is allowed to warm above $T_c$, but has not yet reached $T_h$.

The infant drinking cup of the present invention is preferably formed from plastic. It is preferable that the plastic be a thermoplastic polymer, most preferably polypropylene. The polypropylene is blended with a temperature responsive coloring composition. Suitable temperature responsive coloring compositions are disclosed in U.S. Pat. No. 5,431,697 to Kamata, et al, which is hereby incorporated by reference in its entirety.

The temperature responsive coloring composition preferably does not express a dominantly visible color at or above a hot temperature ($T_h$). However, the temperature responsive coloring composition may express a second color above $T_h$, the second color taking the role of the warm color more preferably expressed by a thermally stable pigment. As temperature drops below $T_h$, the temperature responsive coloring composition begins to express the dominant cold color, expressing more and more cold color until a critical cold temperature, $T_c$, is reached. At $T_c$ or below, the dominant cold color is fully expressed, thereby completely masking the non-dominant warm color.

As noted above, at temperatures between $T_c$ and $T_h$, the temperature responsive coloring composition is partially expressed. The infant drinking cup therefore expresses a hybrid color in this range. The hybrid color tends toward the dominant cold color as temperature approaches $T_c$. The cold color is preferably darker than the warm color. As a darker color, the cold color will typically mask the warm color whenever expressed.

Numerous species of compounds may be used to form the temperature responsive coloring composition; the selection depends upon the desired cold color, and the desired values for $T_c$ and $T_h$. Individual species will express different colors and do so at different critical temperatures.

Suitable temperature responsive coloring compositions may be formed from an olefin polymer and a thermochromic material. Olefin polymers containing alkoxysilane side chains may be particularly well suited. In the preferred embodiment of the invention, wherein polypropylene is the base resin of the infant drinking cup 10, polypropylene should also form the base chain of the olefin polymer of the temperature responsive coloring composition.

The thermochromic material may include one of a number of suitable species of acid responsive chromogenic compounds. The selection of the specific chromogenic compound will, of course, depend on the desired cold color of the finished product and the desired critical hot and critical cold temperatures ($T_h$ and $T_c$). The thermochromic material also includes an acidic compound, the selection of which similarly depends upon the desired colors and the desired critical temperatures.

Suitable temperature responsive coloring compositions are commercially available from Matsui International Co., Inc. of Gardena, Calif. and are sold under the registered trademark "CHROMICOLOR".

Available cold colors for the temperature responsive coloring compositions (and thus for the cold color of the infant drinking cup) include yellow, orange, vermilion, rose, magenta, blue, green, black and brown. The possible warm colors of the cup are limited only by the availability of well known thermally stable pigments and, as noted earlier, that the cold color preferably be darker and dominant over the warm color. The most preferred embodiment of the invention is formed using various colors of CHROMICOLOR® type 17 obtained from Matsui International.

The temperature responsive coloring composition should be blended with the base resin at a concentration of between 5 and 20 percent by weight of temperature responsive coloring composition. In the preferred embodiment, wherein the base resin is polypropylene, the temperature responsive coloring composition has been found to be effective at concentrations between 6 and 10 percent by weight. A concentration of 6 percent by weight of temperature responsive coloring composition is preferred for reasons of economy. Additional additives well known to those skilled in the art, such as stabilizing agents and cross-linking agents, may also be added to the blend.

Once the base resin and the temperature responsive coloring composition have been blended, the blend is molded into the cup. Blow molding and injection molding are both acceptable techniques for producing the infant drinking cup, blow molding being presently preferred. Molding techniques conforming to standard polypropylene processing parameters have been found to be effective. Molding temperature normally should not exceed 235 degrees C., because temperatures greater than 235 degrees C. could cause damage to the temperature responsive coloring composition.

The cup may be molded in many different shapes and sizes, as well as colors. The preferred embodiment of the invention has a middle region of decreased diameter for easy grasping as can be seen in the drawings. The preferred embodiment is further provided with wave patterns formed from ridges in the cup (not shown in the Figures). The waves provide a good gripping surface for the user, and also provide decoration for the cup. Those skilled in the art will recognize that the number of esthetic designs which could be placed on the cup are limited only by the designers imagination.

Figure 5:
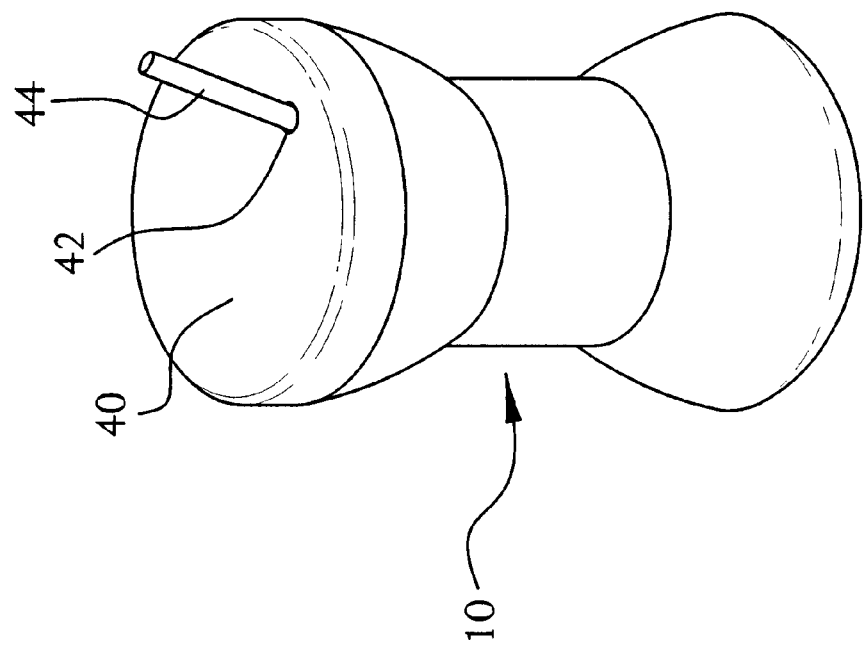
FIG. 5 is a perspective view from above the front of an infant drinking up according to the present invention, the infant drinking cup having a lid with a straw.
Figure 4:
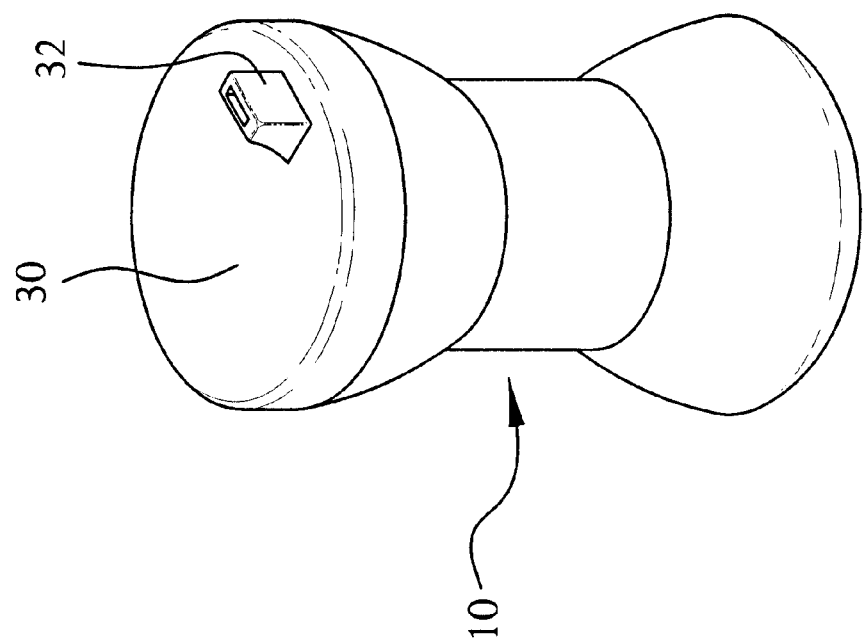
FIG. 4 is a perspective view from above the front of an infant drinking up according to the present invention, the infant drinking cup having a lid with a drink spout.

The preferred embodiment of cup 10 further includes threads 22 disposed near the top of the cup. The threads are capable of receiving a lid or cap, as seen in FIGS. 4 and 5, the lid or cap preferably having a drink spout, straw or other means for minimizing spills and assisting in withdrawal of fluid from the cup. FIG. 4 shows an infant drinking cup 10 having a lid 30 disposed atop the cup 10. The lid 30 is removably engaged with the threads 22 of cup 10, threads 22 being shown in FIGS. 1 through 3. The lid 30 is provided with a drink spout 32. Drink spout 32 may come in many different forms well known to the skilled artisan. Some drink spouts provide a flap or valve within the spout structure to prevent spillage therefrom when the cup is unexpectedly inverted. Other spouts rely on the narrowness of the channel and aperture at the end of the spout to minimize spillage.

Referring now to FIG. 5, the cup 10 is provided with a lid 40 which is removably engaged with threads 22 seen in FIGS. 1 through 3. Lid 40 is provided with an aperture 42, through which straw 44 may be inserted. Most people will readily recognize that straws of many shapes and sizes may be substituted for straw 44 as shown.

Although the beverage consumer has been described as an infant herein, it should be obvious that many adults may also receive pleasure out of using a cup according to the present invention.

The present invention may be embodied in other specific forms without departing from the spirit or essential attributes thereof and, accordingly, reference should be made to the appended claims, rather than to the foregoing specification, as indicating the scope of the invention.

What is claimed is:

1. An infant drinking cup comprising:
    a liquid receiving vessel uniformly formed from a homogenous material comprising a polymer resin, a thermally stable pigment providing the cup with a first color, and a temperature responsive coloring composition partially expressing a second color when between a critical hot temperature and a critical cold temperature that is below the critical hot temperature, and fully expressing the second color when below the critical cold temperature;

the critical hot temperature and the critical cold temperature being temperatures within the range at which a beverage is comfortably consumed by an infant;

any portion of the cup that is at a temperature greater than the critical hot temperature being the first color;

the second color being darker than the first color, such that the second color masks the first color when the second color is expressed and any portion of the cup that is below the critical cold temperature is the second color; and any portion of the cup that is between the critical hot temperature and the critical cold temperature being a hybrid color.

2. The infant drinking cup of claim 1 wherein the polymer is a thermoplastic polymer.

3. The infant drinking cup of claim 1 wherein the polymer is polypropylene.

4. The infant drinking cup of claim 1 wherein the temperature responsive coloring composition comprises an olefin polymer and a thermochromic material, the thermochromic material having an acid-responsive chromogenic compound, and an acidic substance.

5. The infant drinking cup of claim 1 wherein the critical hot temperature is between 19 and 27 degrees centigrade.

6. The infant drinking cup of claim 5 wherein the critical hot temperature is between 22 and 24 degrees centigrade.

7. The infant drinking cup of claim 1 wherein the critical cold temperature is between 10 and 18 degrees centigrade.

8. The infant drinking cup of claim 7 wherein the critical cold temperature is between 13 and 15 degrees centigrade.

9. A drinking cup comprising:
a fluid receiving vessel uniformly formed from a homogenous material comprising
a polymer resin, a thermally stable pigment providing the cup with a first color, and a temperature responsive coloring composition partially expressing a second color when between a critical hot temperature and a critical cold temperature that is below the critical hot temperature, and fully expressing the second color when below the critical cold temperature;

the critical hot temperature and the critical cold temperature being temperatures within the range at which a beverage is comfortably consumed by a user;

the expression of the second color masking the first color in any portion of the cup that is below the critical cold temperature, thereby causing the portion below the critical cold temperature to appear to be the second color; and the partial expression of the second color partially masking the first color in any portion of the cup that is between the critical hot temperature and the critical cold temperature, thereby causing the portion between the critical hot temperature and the critical cold temperature to appear to be a hybrid color.

10. The drinking cup of claim 9 wherein the polymer is a thermoplastic polymer.

11. The drinking cup of claim 9 wherein the polymer is polypropylene.

12. The drinking cup of claim 9 wherein the temperature responsive coloring composition comprises an olefin polymer and a thermochromic material, the thermochromic material having an acid-responsive chromogenic compound, and an acidic substance.

13. The drinking cup of claim 9 wherein the critical hot temperature is between 19 and 27 degrees centigrade.

14. The drinking cup of claim 9 wherein the critical cold temperature is between 10 and 18 degrees centigrade.

* * * * *